Patented Mar. 2, 1926.

1,574,862

UNITED STATES PATENT OFFICE.

AUGUST BENSON, OF CHICAGO, ILLINOIS.

COATING COMPOSITION.

No Drawing.   Application filed July 19, 1924.  Serial No. 727,059.

*To all whom it may concern:*

Be it known that I, AUGUST BENSON, a citizen of the United States, residing at Chicago, in the county of Cook and State of Illinois, have invented new and useful Improvements in Coating Compositions, of which the following is a specification.

This invention relates to a compound for coating walls, vases and other surfaces where an ornamental effect is desired.

An object of the invention is the provision of a compound for coating the surfaces of such body materials as wood, glass, clay and in fact any composition or material since the coating is of a character as not to be affected by the materials of the object treated.

Another object of the invention is the provision of a coating for the surfaces of objects which will give not only a brilliant lustre but a pleasing color effect to the object.

A further object of the invention is the provision of a coating for the surfaces of objects presenting a brilliant lustre, a phosphorescent background and at the same time furnishing a hard coating lacking brittleness which will resist destruction during cleaning.

In carrying out my invention I thoroughly mix equal parts by weight of powdered white magnesite, silica, in the form of fine sand, and infusorial earth. The mixture is placed in a suitable container and heated to 1300° F. for one hour. The chemical reaction which takes place during heating causes the mixture to become a granulated mass. The granules are removed from the container when cool and ground to a fine powder.

The magnesite provides an alkali which gives body and stability to the compound which is insoluble in ordinary liquids. The silica or sand is neutralized by the alkali, and forms a filler while the infusorial earth acts as a flux.

A solution of magnesium chloride, 30° Baumé, is added to and thoroughly stirred into the powdered mass until it becomes the consistency of thick cream. The solution of magnesium chloride being a heavy fluid acts as a binder of the mass. The creamy solution is of a semi-transparent nature and is now in condition to be applied directly to surfaces of objects after the addition of some pigment which will give a desired effect.

As it is intended that the coating shall be of a luminous character one of the so-called luminous powders is added to the cream before its application to a surface. Such luminous powders are commercially well known in European countries. While these powders per se form no part of the present invention, the basic principles of the powders are summed up as follows.

The illuminating effect of phosphorescent masses obtained by heating strontium thiosulphate or barium thiosulphate is considerably increased by the addition before heating of small quantities of the nitrates of uranium, bismuth or thorium. The product formed from strontium thiosulphate is more luminous than that of the barium compound. Calcium thiosulphate may be employed without the addition of the nitrates since the nitrates do not aid the luminous qualities of the calcium salt.

Among the best luminous paints the following are examples:—

I. One hundred parts, by weight, of strontium carbonate; 100 parts, by weight, of sulphur; 0.5 parts, by weight, of potassium chloride; 0.5 parts, by weight, of sodium chloride; 0.4 parts, by weight, of manganese chloride. The materials are heated for three-quarters of an hour to one hour, to about 2,372° F. The product gives a violet light.

II. One hundred parts, by weight, of strontium carbonate; 30 parts, by weight, of sulphur; 2 parts, by weight, of sodium carbonate; 0.5 parts, by weight, of sodium chloride; 0.2 parts, by weight, of manganese sulphate. The method of treatment is the same as in the first, the phosphorescence deep yellow.

III. Sixty parts, by weight, of strontium thiosulphate; 12 parts, by weight, of a 0.5 per cent acidified alcholic solution of bismuth nitrate; 6 parts by weight, of a 0.5 per cent alcholic solution of uranium nitrate. The materials are mixed, dried, brought gradually to a temperature of 2,372° F., and heated for about an hour. The phosphorescence is emerald green.

IV. Twenty parts, by weight, of calcium oxide (burnt lime) free from iron; 6 parts, by weight, of sulphur; 2 parts, by weight, of starch; 1 part, by weight, of a 0.5 per cent solution of bismuth nitrate; 0.15 parts, by weight, of potassium chloride; 0.15 parts, by weight, of sodium chloride. The materials are mixed, dried, and heated to 1,300° C. (2,372° F.). The product gives a violet light.

These phosphorescent substances are effective after exposure to direct sunlight, a mercury lamp or after a prolonged exposure to a powerful incandescent gas light.

A quantity of any of the luminous powders just described is added to the cream, the particular amount depending upon the degree of luminosity desired. The cream is spread over the surface of the object in a thin layer and while said layer is still soft, granulated glass is applied to provide an outer surface. The granules of glass vary in size from the smallest particles to that of a pea and the size employed depends upon the extent of the surface treated, walls requiring the largest pellets, while vases and buttons necessitate the use of a size in proportion to the limited surfaces that are decorated.

The particles of glass are effectually trimmed for the exposure of the greatest possible number of iridescent surfaces and at the same time for the removal of all sharp projections. The particles of glass must be properly trimmed for the diffusion of light and to prevent injury to persons coming in contact with the surfaces.

The resultant effect of such a coating is one of great brilliance since the phosphorescent background illuminates the surface coating of the fine particles of glass. Color effects may be had by the addition of suitable dry pigments to the cream before the glass has been applied.

What I claim is:

1. A semi-transparent surface coating comprising a powdered mass consisting of equal parts of magnesite, silica and infusorial earth fused together, and a solution of magnesium chloride.

2. A semi-transparent surface coating comprising a powdered mass consisting of equal parts of magnesite, silica and infusorial earth fused together at a temperature of approximately 1300° F., and a solution of magnesium chloride.

3. A semi-transparent surface coating comprising a powdered mass consisting of equal parts of magnesite, silica and infusorial earth fused together at a temperature of approximately 1300° F., a solution of magnesium chloride, a luminous paint, and granules of glass.

4. The process of forming a surface coating which comprises heating a mixture of magnesite, silica and a flux to 1300° F., grinding the mass to a fine powder, adding a solution of magnesium chloride to provide a fluid of the consistency of cream, and then adding a luminous paint, spreading a layer of the thick cream on the surface and applying granular glass to the layer to form a surface coating.

5. The process of forming a semi-transparent surface coating which comprises heating a mixture of magnesite, silica and infusorial earth until the mass has become fused, grinding the mass to a fine powder and adding a liquid binder to form a paste of the consistency of cream.

6. The process of forming a semi-transparent surface coating which comprises heating a mixture of magnesite, silica and a flux to 1300° F., grinding the mass to a fine powder, adding a solution of magnesium chloride to provide a fluid of the consistency of cream.

In testimony whereof I affix my signature.

AUGUST BENSON.